(12) United States Patent
Hashimoto et al.

(10) Patent No.: US 12,072,685 B2
(45) Date of Patent: Aug. 27, 2024

(54) DATA COLLECTION SYSTEM AND MOTOR CONTROLLER

(71) Applicant: KABUSHIKI KAISHA YASKAWA DENKI, Kitakyushu (JP)

(72) Inventors: Ayaka Hashimoto, Kitakyushu (JP); Hiroshi Okamoto, Kitakyushu (JP); Masaomi Kudo, Kitakyushu (JP); Yu Katono, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 757 days.

(21) Appl. No.: 17/183,345

(22) Filed: Feb. 24, 2021

(65) Prior Publication Data

US 2021/0181709 A1 Jun. 17, 2021

Related U.S. Application Data

(63) Continuation of application No. PCT/JP2019/029658, filed on Jul. 29, 2019.

(30) Foreign Application Priority Data

Aug. 30, 2018 (JP) ................ 2018-162195

(51) Int. Cl.
*G05B 21/02* (2006.01)
*G05B 19/4063* (2006.01)

(52) U.S. Cl.
CPC ........... *G05B 19/4063* (2013.01); *G05B 2219/31229* (2013.01); *G05B 2219/42256* (2013.01)

(58) Field of Classification Search
CPC ................................. G05B 19/4063
(Continued)

(56) References Cited

U.S. PATENT DOCUMENTS 3,999,163 A * 12/1976 Levy .............. G06F 3/0601
714/5.1
7,656,106 B2 * 2/2010 Iwashita .......... G05B 19/4141
318/68

(Continued)

FOREIGN PATENT DOCUMENTS

CN 101680920 3/2010
CN 104106206 10/2014
(Continued)

OTHER PUBLICATIONS

International Search Report for corresponding International Application No. PCT/JP2019/029658, dated Oct. 8, 2019.
(Continued)

*Primary Examiner* — Erick D Glass
(74) *Attorney, Agent, or Firm* — MORI & WARD, LLP

(57) ABSTRACT

A data collection system includes a subordinate controller configured to control an electrical device, and a superordinate controller connected to the subordinate controller via synchronous communication and asynchronous communication to control the subordinate controller. The superordinate controller includes a reference signal transmitter to transmit a timing reference signal to the subordinate controller via the synchronous communication. The subordinate controller includes data storage configured to record data relating to the electrical device; a delay time calculator to measure a delay time from a timing at which the subordinate controller receives the timing reference signal to a timing at which the data storage starts recording the data; and a data transmitter configured to transmit the data and the delay time to the superordinate controller via the asynchronous communication or the synchronous communication.

16 Claims, 11 Drawing Sheets

(58) Field of Classification Search
USPC .......................................................... 318/636
See application file for complete search history.

(56) References Cited

U.S. PATENT DOCUMENTS

| | | | | |
|---|---|---|---|---|
| 2005/0085939 | A1* | 4/2005 | Nakazato | G05B 19/404 |
| | | | | 700/173 |
| 2010/0277158 | A1 | 11/2010 | Lee et al. | |
| 2014/0354194 | A1 | 12/2014 | Toba et al. | |
| 2016/0239009 | A1 | 8/2016 | Mizuno | |
| 2017/0300023 | A1 | 10/2017 | Hibara et al. | |
| 2018/0254982 | A1* | 9/2018 | Apostolopoulos | H04L 45/302 |

FOREIGN PATENT DOCUMENTS

| | | |
|---|---|---|
| JP | 10-327217 | 12/1998 |
| JP | 2015-60612 | 3/2015 |
| JP | 6288104 B2 | 5/2015 |

OTHER PUBLICATIONS

Written Opinion for corresponding International Application No. PCT/JP2019/029658, dated Oct. 8, 2019.
Chinese Office Action for corresponding CN Application No. 201980046867.1, dated Nov. 27, 2023 (w/ English machine translation).
European Office Action for corresponding EP Application No. 19855008.9—1205, Feb. 9, 2024.
Extended European Search Report for corresponding EP Application No. 19855008.9—1205, Apr. 29, 2022.

* cited by examiner

FIG. 9

Logging Data

| Calendar Information | Sensor Value | Speed Command | Output Speed | Output Position | Torque Command |
|---|---|---|---|---|---|
| 14:35:07 on July 17, 2018 ****** μs(=ts) | ◇◇◇ | ■■■ | ×××  | △△△ | □□□ |
| 14:35:07 on July 17, 2018 ****** μs(=ts+ Δt) | ◇◇◇ | ■■■ | ××× | △△△ | □□□ |
| 14:35:07 on July 17, 2018 ****** μs(=ts+2Δt) | ◇◇◇ | ■■■ | ××× | △△△ | □□□ |
| 14:35:07 on July 17, 2018 ****** μs(=ts+3Δt) | ◇◇◇ | ■■■ | ××× | △△△ | □□□ |
| 14:35:07 on July 17, 2018 ****** μs(=ts+4Δt) | ····· | ····· | ····· | ····· | ····· |

DATA COLLECTION SYSTEM AND MOTOR CONTROLLER

CROSS-REFERENCE TO RELATED APPLICATIONS

The present application is a continuation application of International Application No. PCT/JP2019/029658, filed Jul. 29, 2019, which claims priority to Japanese Patent Application No. 2018-162195, filed Aug. 30, 2018. The contents of these applications are incorporated herein by reference in their entirety.

BACKGROUND

Technical Field

The present embodiment relates to a data collection system and a motor controller.

Discussion of the Background

Japanese Patent No. 6288104 discloses a data collection system including a motor controller that controls a motor and collects trace data related to the motor, and a controller that controls the motor controller and sends a trace start signal to the motor controller.

SUMMARY

According to one aspect of the present invention, a data collection system includes a subordinate controller configured to control an electrical device, and a superordinate controller connected to the subordinate controller via synchronous communication and asynchronous communication to control the subordinate controller. The superordinate controller includes a reference signal transmitter to transmit a timing reference signal to the subordinate controller via the synchronous communication. The subordinate controller includes data storage configured to record data relating to the electrical device; a delay time calculator to measure a delay time from a timing at which the subordinate controller receives the timing reference signal to a timing at which the data storage starts recording the data; and a data transmitter configured to transmit the data and the delay time to the superordinate controller via the asynchronous communication or the synchronous communication.

According to another aspect of the present invention, a motor controller configured to control a motor includes data storage configured to record data relating to the motor; a delay time calculator to measure a delay time from a timing at which a timing reference signal is received from a controller to a timing at which the data storage starts recording the data; and a data transmitter configured to transmit the data and the delay time to the controller via the asynchronous communication or the synchronous communication.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings.

FIG. 9 is a schematic diagram of the generated logging data.

DESCRIPTION OF EMBODIMENTS

Hereinafter, an embodiment will be described with reference to the drawings.

<Overall Configuration of Data Collection System>

An example of an overall configuration of a data collection system for industrial equipment according to the present embodiment will be described with reference to FIG. 1.

Figure 1:
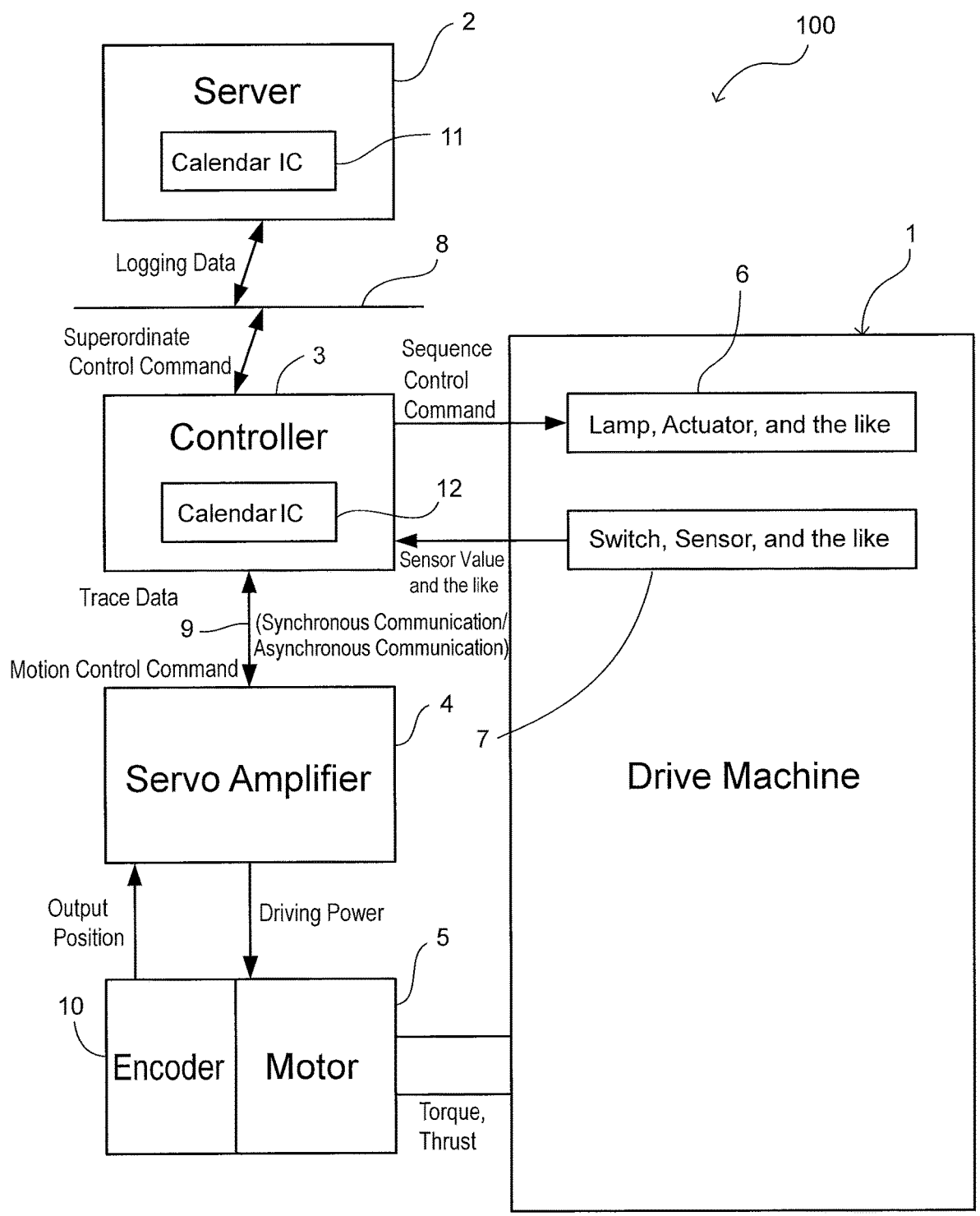
FIG. 1 is a diagram illustrating a schematic block configuration of a data collection system according to the embodiment.

FIG. 1 shows a schematic block configuration of a data collection system. In the example of the present embodiment, a description will be given of a control system that controls driving of a driving machine that is industrial equipment, and a system that can also collect data for the purpose of predicting and optimizing an abnormality. As illustrated in FIG. 1, the data collection system 100 includes a drive machine 1, a server 2, a controller 3, a servo amplifier 4, and a motor 5.

The drive machine 1 is a machine system whose driving is controlled by the data collection system 100 and in which data related to the driving and the state is collected. As an internal configuration of the drive machine 1, most of the drive machine 1 is a mechanism portion whose operation is controlled by torque or thrust input from a motor 5 described later. The drive machine 1 according to the present embodiment further includes a display device such as a lamp directly controlled by the controller 3 described later, or various actuators 6 such as a solenoid and an air cylinder. In addition, the drive machine 1 also includes various switches, sensors 7, and the like, such that the controller 3 described later is configured to directly detect states thereof and the detection values.

The server 2 is constituted by, for example, a general-purpose personal computer including a CPU and memories such as a ROM and a RAM, which are not particularly illustrated, and outputs superordinate control command for enabling the drive machine 1 to perform a driving operation according to a desired process to the controller 3 described later via the communication network 8 such as Ethernet (registered trademark). Further, in the example of the present embodiment, the server 2 has a function of controlling the entire data collection system 100 so as to acquire various data related to the drive machine in accordance with an input operation from a user or a predetermined setting condition, and a function of receiving logging data (to be described later) in which the acquired various data is arranged in time series from the controller 3 and performing abnormality prediction and optimization of control of the drive machine 1 based on the data analysis.

The controller 3 is constituted by a computer including a CPU and memories such as a ROM and a RAM, which are not particularly shown, and is a control device that controls the drive machine 1 to perform a desired operation over time based on a superordinate control command input from the server 2. Specifically, the motion control function includes a motion control function of outputting a motion control command for instructing a motor 5, which is a main power source of the drive machine 1, to perform a desired motion operation in real time with high accuracy to a servo amplifier 4 (described later) via a so-called field network 9. As another mode of operation control, the controller 3 also has a sequence control function of outputting a sequence control command for instructing the lamp, various actuators 6, and the like included in the drive machine 1 to operate over time via an interface such as an I/O port (not shown) included in the controller 3. The controller 3 of this example also has a function of sequentially reading state information, sensor values, and the like from the various switches and sensors 7 included in the drive machine 1 via an interface such as an I/O port (not shown). See FIG. 2 below for this function. In addition, in the example of the present embodiment, it has a function of chronologically arranging various data related to the drive machine 1 received from the servo amplifier 4 described later together with the state information and the sensor value read by the I/O port, generating the data as logging data, and transmitting the data to the server 2. In addition, in the example of the present embodiment, it has a function of chronologically arranging various data related to the drive machine 1 received from the servo amplifier 4 described later together with the state information and the sensor value read by the I/O port, generating the data as logging data, and transmitting the data to the server 2(Will be described in detail later).

The servo amplifier 4 is constituted by a computer including a CPU and memories such as a ROM and a RAM, which are not particularly shown, and is a motor controller that supplies driving power to the motor 5 described later to perform drive control so as to follow the motion control command received from the controller 3 in real time and with high accuracy. Further, in the example of the present embodiment, the servo amplifier 4 also has a function of sequentially acquiring various data such as a torque command generated in the process of supplying driving power and an output speed and an output position actually output from the motor as time—series trace data, recording the data in the memory, and outputting the data to the controller 3. In addition, in the example of the present embodiment, the servo amplifier 4 also has a function of sequentially acquiring various data such as a torque command generated in the process of supplying driving power and an output speed and an output position actually output from the motor as time—series trace data, recording the data in the memory, and outputting the data to the controller 3. The acquisition function is described later with reference to FIG. 2.

The motor 5 is, for example, a rotary or linear motor, and generates torque or thrust for driving the operation of the drive machine 1 by the driving power supplied from the servo amplifier 4. The motor 5 in this example is assumed to be of a rotary type, and the motor 5 is provided with an encoder 10 for optically detecting an output position (rotational position) thereof. The encoder 10 is also referred to as an external device. When the motor 5 is of a direct—acting type, a linear scale or the like is provided instead of the encoder 10.

In the system configuration described above, particularly in the field network 9 for transmitting and receiving information between the controller 3 and the servo amplifier 4, it is possible to switch between synchronous communication for ensuring real-time performance when transmitting and receiving motion control commands and asynchronous communication for transmitting and receiving information with relatively low priority (will be described in detail later). In such a field network 9, the synchronous communication and the asynchronous communication may be implemented by the same protocol on the same cable line, or the synchronous communication and the asynchronous communication may be implemented separately.

Each of the server 2 and the controller 3 includes a calendar IC11 12 that generates calendar information expressed by an absolute time of "year/month/day/hour/minute/second" based on the standard time of the time zone to which the operation location of the data collection system 100 belongs. Based on the calendar information of the calendar IC12, the controller 3 generates logging data in which information on the acquisition time is given to each of various kinds of information including the trace data (will be described in detail later). Then, the server 2 which received the logging data analyzes the data based on the comparison between the individual acquisition time and the calendar information of the calendar IC11, predicts the abnormality of the drive machine 1 and optimizes the control.

In the above—described system configuration, the motor 5 corresponds to an electrical device described in each claim, the servo amplifier 4 corresponds to a subordinate controller described in each claim, the server 2 and the controller 3 correspond to a superordinate controller described in each claim, the server 2 corresponds to a management controller described in each claim, and the motor 5 and the drive machine 1 correspond to industrial equipment described in each claim.

<Data Transmission/Reception Method between Controller and Servo Amplifier>

Figure 2:
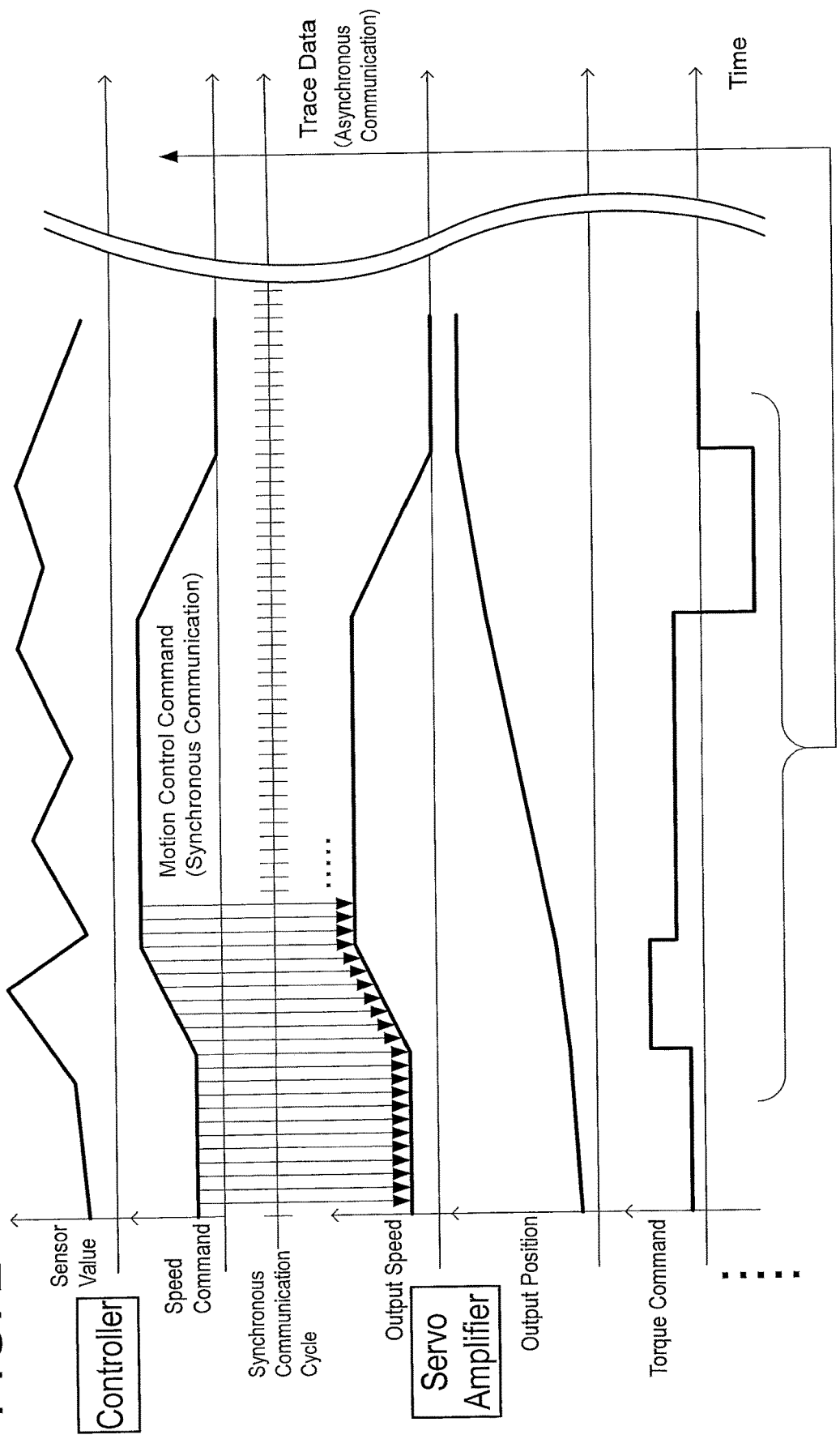
FIG. 2 is a time chart showing a method of transmitting and receiving data between a general controller and a servo amplifier.

Next, a method of transmitting and receiving data between the controller 3 and the servo amplifier 4 in the data collection system will be described with reference to FIG. 2. As described above, the two nodes of the controller 3 and the servo amplifier 4 can sequentially acquire and store various data related to the operation control and the state of the drive machine 1 individually. In the illustrated example, the controller 3 itself independently detects sensor values indicating the states from the sensors 7 included in the drive machine 1 via the I/O port, and records the sensor value as time series data. In this case, the CPU of the controller 3 reads the sensor value at a predetermined cycle by the interrupt processing, and the acquisition time of each datum can be managed by referring to the calendar information from the calendar IC12 provided in the controller 3 or the counter value of the interrupt processing (not particularly shown).

The illustrated example shows a case where the controller 3 outputs a speed command calculated to be output from the motor 5 to the servo amplifier 4 as a motion control command, that is, a case where speed control is performed, and the motion control command is transmitted and received from the controller 3 to the servo amplifier 4 by the synchronous communication of the field network 9 described above. At this time, the communication control devices (not particularly shown) for the field network 9 included in the controller 3 and the servo amplifier 4 sequentially transmit and receive the motion control command in the same cycle in which the phase difference is sufficiently small and sufficiently short. Hereinafter, this cycle is referred to as a synchronous communication cycle. Thus, even when the motion control command transmitted from the controller 3 varies with time, the servo amplifier 4 can perform follow-up control corresponding to the variation of the motion control command with sufficient real time property.

In the illustrated example, the servo amplifier 4 sequentially acquires and records various data such as an output speed and an output position actually output from the motor 5 as a result of follow-up control of the motion control command received by the synchronous communication and a torque command generated in the process of the follow-up control as time-series trace data. The output speed may be calculated by calculating the output position detected from the encoder 10 by time differentiation or the like.

Here, the servo amplifier 4 executes the follow-up control of the motion control command described above as a synchronous task synchronized with the synchronous communication cycle, and on the other hand, executes the trace processing of various data in a unique control cycle (will be described later in detail). However, since the synchronous communication cycle is very short, it is difficult for the servo amplifier 4 to sequentially return various trace data to the controller 3 for each synchronous communication cycle. Therefore, in order to return trace data having a large data capacity acquired by the servo amplifier 4 to the controller 3, it is necessary to collectively return the trace data through asynchronous communication performed at an arbitrary timing during the non-execution period of the synchronous task.

Then, the controller 3 collects various trace data received from the servo amplifier 4 together with the time-series data of the sensor value and the motion control command detected by the controller 3 itself, and generates logging data to which information of the acquisition time is added in each data unit. Although the types of time-series data shown in FIG. 2 are limited for reasons of space, various types of time-series data such as sequence control commands directly output from the controller 3 to the drive machine 1, speed deviations and estimated disturbances detectable by the servo amplifier 4, and state data such as temperature and humidity inside the servo amplifier 4 may be included in the logging data (trace data).

Features of the Embodiment

As described above, as a control configuration of a general industrial equipment system, there are many cases in which the industrial equipment system (corresponds to the drive machine 1 in this embodiment) includes a subordinate controller (corresponds to the servo amplifier 4 in this embodiment) that controls electrical device (corresponds to the motor 5 in this embodiment) included in the industrial equipment and a superordinate controller (corresponds to the server 2 and the controller 3 in this embodiment) that controls the subordinate controller. In general, the subordinate controller and the superordinate controller transmit and receive important control commands (corresponds to the motion control command in this embodiment) with high priority through synchronous communication in a predetermined cycle, and transmit and receive information with low priority through asynchronous communication.

Figure 3:
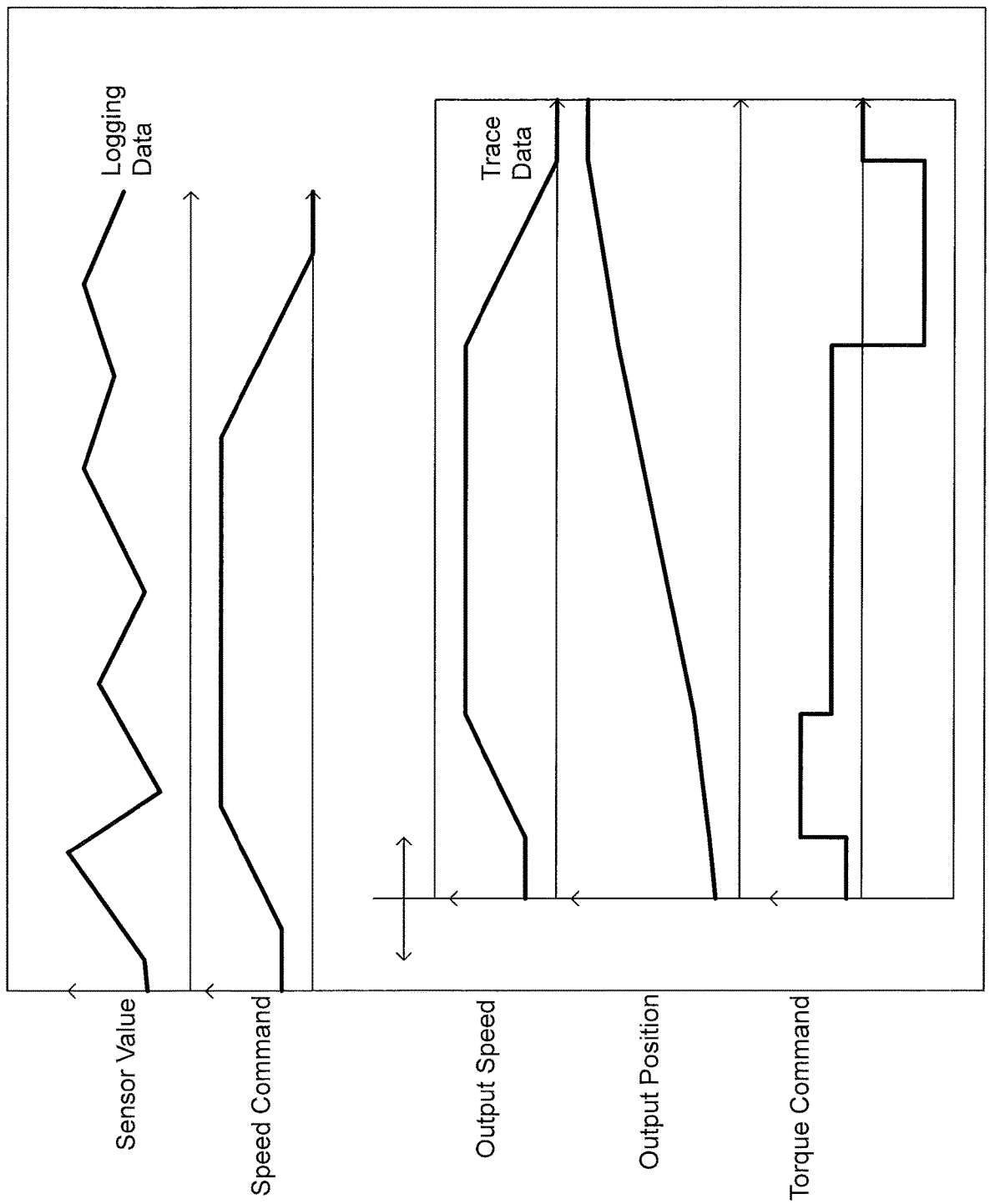
FIG. 3 is a diagram illustrating a case of being impossible to achieve data synchronization between trace data and other data.

In recent years, for the purpose of abnormality prediction and optimization in operation control of an industrial equipment system, development of a collection technique and an analysis technique of various data related to control of electrical device has been advanced. Therefore, in the control configuration of the industrial equipment system as described above, due to the processing resources of each control device, it is necessary to perform processing sharing such that the subordinate controller directly traces and collects data related to the electric equipment, for example, data such as time series data related to control of the electric equipment, and the superordinate controller organizes and summarizes the data so as to facilitate analysis. However, since the data to be traced has a large data capacity, it is difficult to transmit and receive the data in the synchronous communication, and thus the data is often transmitted and received in the asynchronous communication. On the other hand, in the asynchronous communication in which the transmission and reception timing is arbitrary, as shown in FIG. 3, it is unclear at which timing in the control sequence of the superordinate controller the received data is traced, and it is difficult to apply the asynchronous communication to the data analysis in which the acquisition timing is required to be obvious with high accuracy.

In contrast, in the present embodiment, the controller 3, which is a superordinate controller, transmits a trace trigger to the servo amplifier 4, which is a subordinate controller, via synchronous communication. Then, the servo amplifier 4 traces and records data related to the motor 5 which is an electric apparatus, measures a delay time from the reception of the trace trigger to the start of the trace of various data, and transmits the data and the delay time to the controller 3 via asynchronous communication.

Thus, the controller 3 receiving the delay time together with the data via the asynchronous communication can synchronize the data in consideration of the delay time with the transmission timing of the trace trigger transmitted by the controller 3 itself as a reference. That is, the controller 3 can recognize at which timing in its own control sequence the data is traced, and can organize and summarize the data so as to facilitate data analysis. Hereinafter, such a data synchronization method will be sequentially described in detail.

Collecting Trace Data in the Present Embodiment

Figure 4:
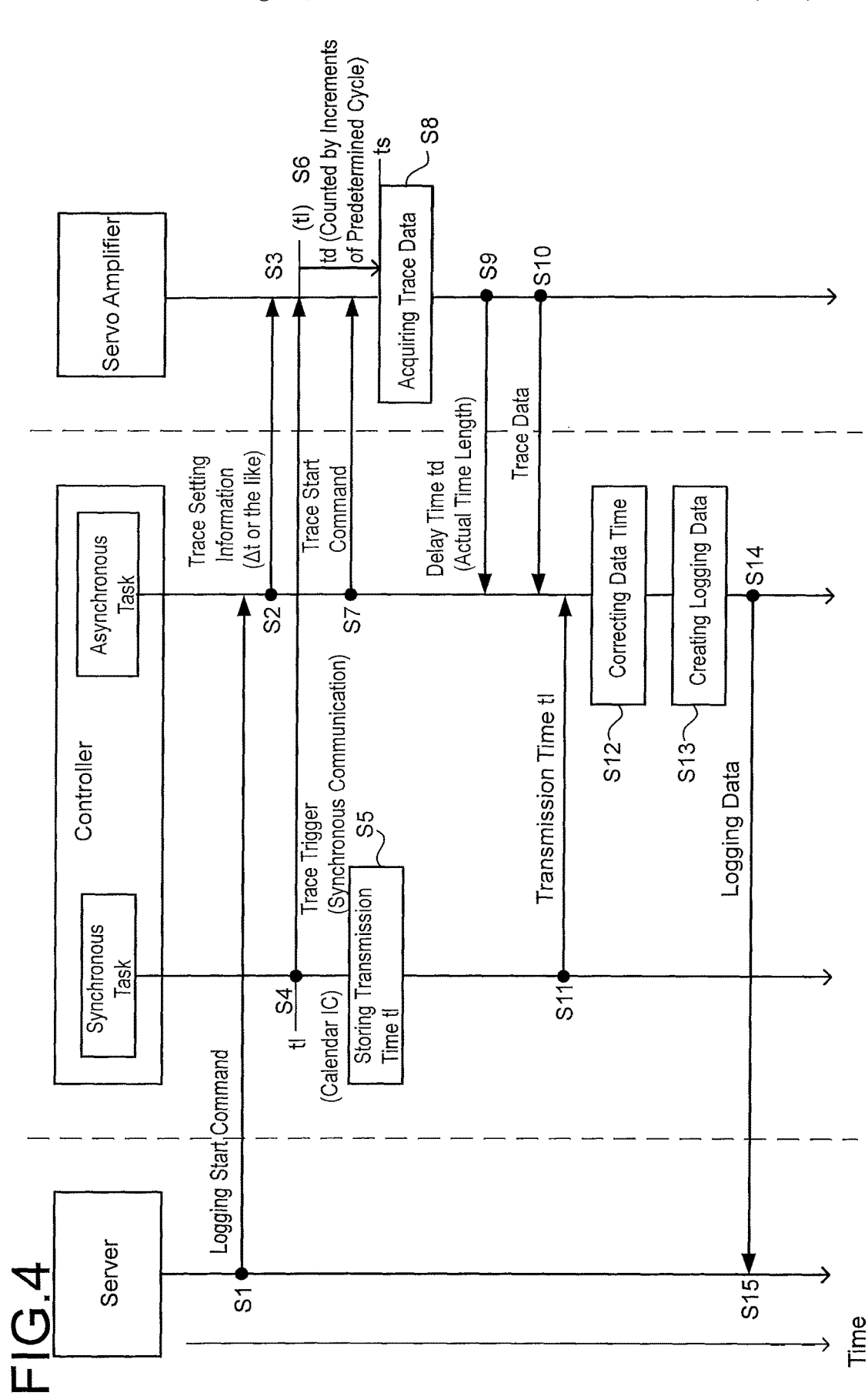
FIG. 4 is a sequence chart illustrating a process of collecting trace data and a process of generating logging data according to the embodiment.

FIG. 4 is a sequence chart showing a process of collecting trace data and a process of generating logging data, which are executed in the data collection system of this embodiment in order to achieve the above-described data synchronization. It should be noted that the sequence chart shown in FIG. 4 shows only transmission and reception and processing of various types of information relating to data collection performed between the nodes of the server 2, the controller 3, and the servo amplifier 4, and it is assumed that normal processing relating to drive control of the drive machine 1 is also performed in parallel in a time division manner. The normal process includes, for example, a process of generating and recording a motion control command in the controller 3 and transmitting the motion control command to the servo amplifier 4 via synchronous communication, and a process of recording a sequence control command transmitted to the drive machine 1 via the I/O port and a sensor value received from the drive machine 1.

The controller 3 of the illustrated example is configured to execute two types of tasks, i.e., a synchronous task and an asynchronous task, in a time division manner by interrupt processing of the CPU. The synchronous task is a task that is executed with the highest priority in synchronization with the synchronous communication cycle as in the generation and transmission processing of the motion control command described above, and the asynchronous task is a task that asynchronously executes processing with a relatively low priority so as not to affect the execution of the synchronous task.

First, in step S1, the CPU of the server 2 transmits a logging start command to the asynchronous task of the controller 3 so as to start generation of logging data related to the control of the drive machine 1 corresponding to the user's operation or a predetermined setting condition.

Next, in step S2, the CPU of the controller 3 receives the logging task command and transmits the trace setting information to the servo amplifier 4 by asynchronous communication. The trace setting information is information for setting details of data trace processing in the servo amplifier 4, and specifically includes trace target information for specifying what kind of data is to be traced, a sampling period $\Delta t$ when tracing data, a trace start condition for starting trace, and the like.

Next, in step S3, the CPU of the servo amplifier 4 receives the trace setting information and starts a pre-preparation process so as to satisfy the trace start condition included in the trace setting information.

Next, in step S4, the CPU of the controller 3 transmits a trace trigger to the servo amplifier 4 by synchronous communication using a synchronous task. The trace trigger is information indicating a time reference of data trace processing in the entire data collection system 100, and is bit information transmitted and received at a specific timing in a serial bit string transmitted and received from the controller 3 to the servo amplifier 4 by synchronous communication. The trace trigger corresponds to a timing reference signal described in each claim. The form of the bit information of the trace trigger will be described later in detail with reference to FIG. 6.

Next, in step S5, the CPU of the controller 3 stores (latches) the transmission time t1 when the trace trigger is transmitted in step S4 by the synchronization task. In the example of the present embodiment, the information of the transmission time t1 is acquired at calendar information of an absolute time notation ("year/month/day/hour/minute/second") measured by a calendar IC12 provided in the controller 3.

Further, in the step S6, the CPU of the servo amplifier 4 resets an integer counter value independently prepared in the servo amplifier 4 when the trace trigger is received in the step S4, and immediately starts a process of counting up (incrementing) the counter value in a predetermined measurement cycle.

Next, in step S7, the CPU of the controller 3 transmits a trace start command to the servo amplifier 4 by asynchronous communication using an asynchronous task. In the example of the present embodiment, the transmission and reception of the trace start command is set as one of the trace start conditions included in the trace setting information received in step S3. The trace start condition in the example of the present embodiment includes completion of various preparation processes necessary for the servo amplifier 4 to execute trace processing of various data. That is, the servo amplifier 4 cannot start the trace processing immediately after receiving the trace trigger, and can start the trace processing in the next step S8 when all trace start conditions such as reception of a necessary start command and completion of various preparation processing are satisfied.

In step S8, the CPU of the servo amplifier 4 acquires trace data. That is, trace processing of various data related to the drive machine 1 is executed. In this tracing process, various kinds of information are traced at the sampling period $\Delta t$ set as the trace setting information in step S2. The count-up of the counter value is also ended at the time point is when the trace processing is started. The counter value at this time measures the delay time td from when the trace trigger is actually received to the start of the trace processing in this step S8, and the actual time length of the delay time td can be calculated by integrating the counter value and the count-up measurement cycle.

Next, in step S9, the CPU of the servo amplifier 4 transmits the delay time td measured in step S8 to the controller 3 by asynchronous communication.

In step S10, the CPU of the servo amplifier 4 also transmits the trace obtained in step 8 to the controller 3 by asynchronous communication. The step S9 and the information transmitted in the step S10 are both received by the asynchronous task of the controller 3.

Next, in step S11, the CPU of the controller 3 transfers the transmission time t1 stored in step S5 by the synchronous task so that the transmission time t1 can be processed by the asynchronous task.

Next, in step S12, the CPU of the controller 3 performs time correction on various control commands and sensor values generated and recorded in the normal processing of the controller 3 by an asynchronous task. Specifically, the time correction is performed in the form of time series data at the sampling period $\Delta t$ and the same trace period as the trace data based on the transmission time t1 of the trace trigger, the delay time td received in the step S9, and the sampling period $\Delta t$ set as the trace setting information in the step S2 (refer to FIG. 8 described later).

Next, in step S13, the CPU of the controller 3 uses an asynchronous task to synchronize the control command and data of the controller 3 time-corrected in step S12 and the trace data received from the servo amplifier 4 in step S10 with the transmission time t1 of the trace trigger as a reference, and creates logging data to which information of the acquisition time is given to each data unit based on the transmission time t1 (see FIG. 9 described later).

Next, in step S14, the CPU of the controller 3 transmits the logging data created in step S13 to the server 2 by an asynchronous task.

Next, in step S15, the CPU of the server 2 stores the logging data received from the controller 3 and uses it for later analysis.

Figure 5:
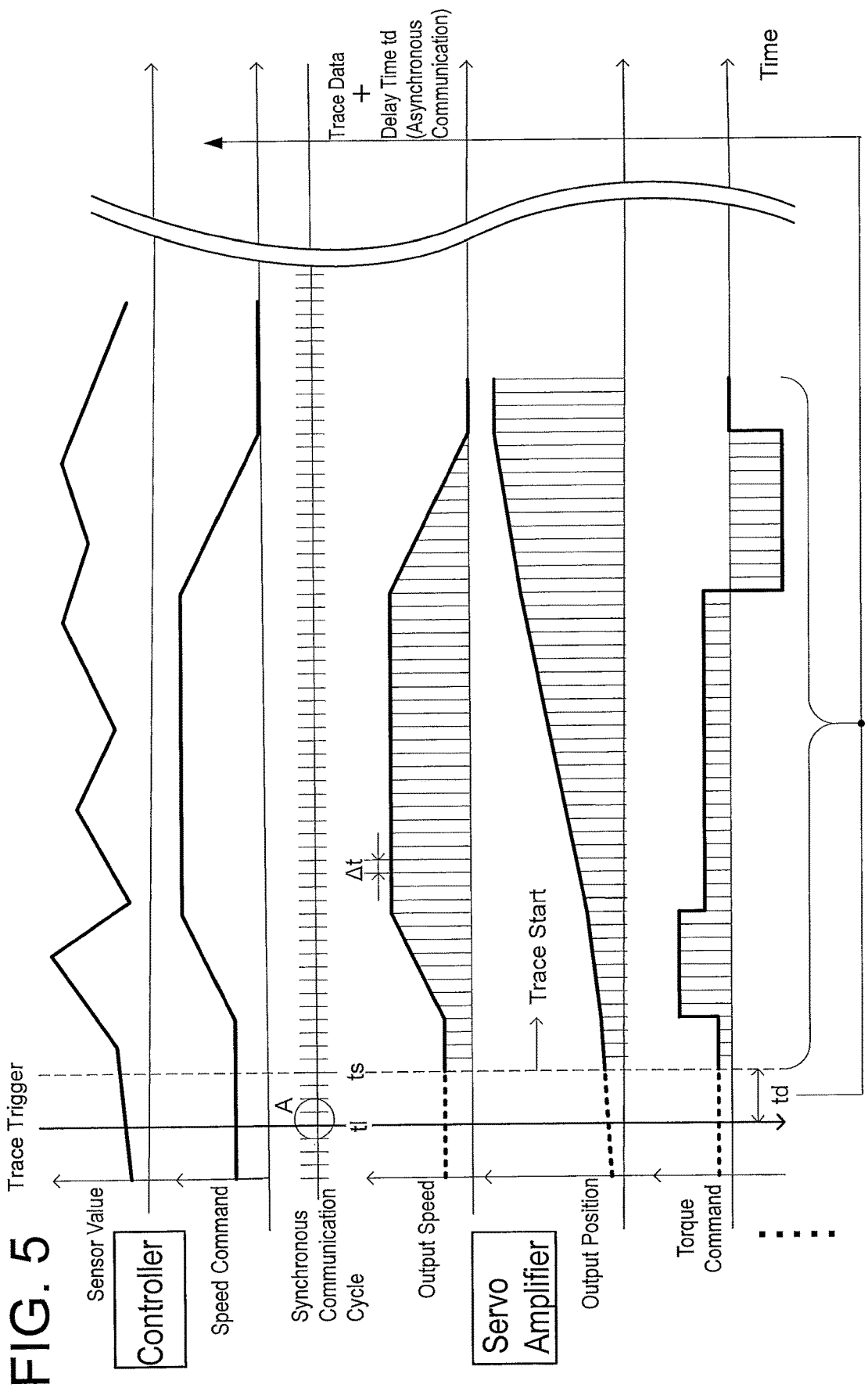
FIG. 5 is a diagram illustrating a collection form of various data in the embodiment.

Various data as shown in FIG. 5 are collected by the steps of the sequence chart described above. That is, while various control commands and sensor values are sequentially recorded on the controller 3 side, the trace trigger synchronized with the synchronous communication cycle is transmitted from the controller 3 to the servo amplifier 4. When all the trace start conditions are satisfied after the transmission of the trace trigger, the trace processing is started by the servo amplifier 4, and a delay time td from the transmission of the trace trigger to the actual start of the trace processing is separately measured. That is, the delay time td corresponds to a relative time difference (so-called time stamp) between the transmission time t1 of the trace trigger and the acquisition time is of the first data of the trace data with respect to the transmission time t1. The trace processing in the servo amplifier 4 is performed at a sampling period Δt. By transmitting the trace data acquired in this way to the controller 3 together with the delay time td, it is possible to synchronize data with other control commands and data acquired on the controller 3 side based on the transmission time t1 of the trace trigger (will be described later).

In the above, the control procedure of the step S4 corresponds to a trigger transmission unit described in each claim, and the control procedure of the step S8 corresponds to a trace unit described in each claim. The count-up processing of the counter value from the step S6 corresponds to a delay time calculator described in each claim. The step S9 and the control procedure of the step S10 correspond to a data transmission unit described in each claim. The control procedure of the step S5 corresponds to a transmission time storage described in each claim. The control procedure of the step S12 and the step S13 correspond to a logging data generator described in each claim. The control procedure of the step S2 corresponds to a setting information transmission unit.

<Transmission Mode of Trace Trigger>

Figure 6:
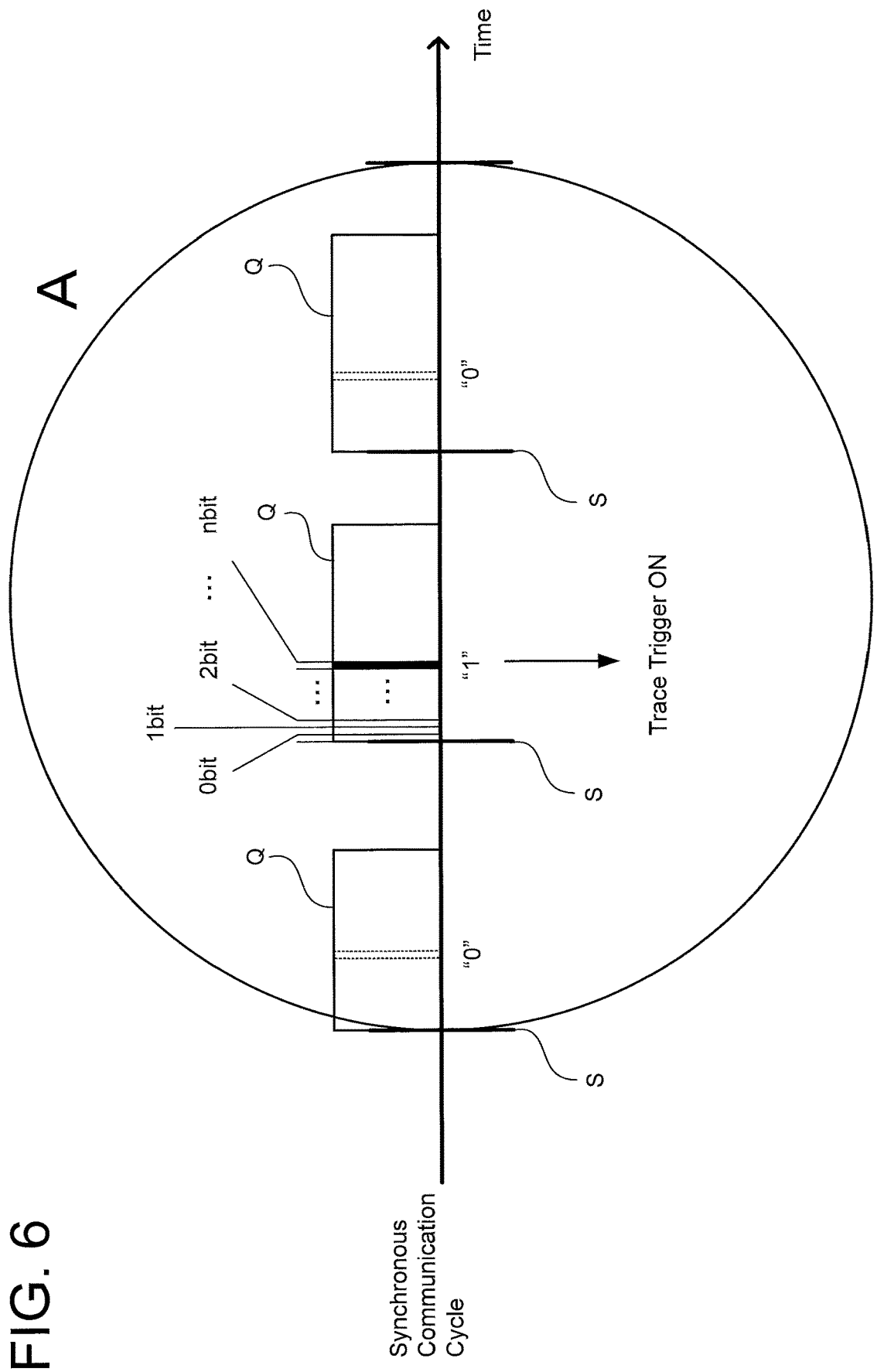
FIG. 6 is an enlarged view of a portion A in FIG. 4 schematically showing serial bit strings transmitted and received by synchronous communication before and after the transmission time of the trace trigger.

FIG. 6 is an enlarged view of the portion A in FIG. 4 and schematically shows serial bit strings transmitted and received by synchronous communication before and after the transmission time t1 of the trace trigger. As illustrated, synchronous communication in the field network 9 of this example is performed by so-called serial communication, and information including a motion control command and the like is repeatedly transmitted and received in a transmission mode of a serial bit string Q over time in a synchronous communication cycle S fixed time interval. The bit length of the serial bit string Q transmitted and received at one time is an indefinite length that varies depending on the content of the motion control command or the like, but the content of the n-th bit (represented as "nbit" in the drawings) at a specific position is assigned to the trace trigger. In this example, when the content of the n-th bit is "1" (that is, positive logic), the trace trigger is turned on.

As described above, since the bit position of the trace trigger in the serial bit string Q is defined by the fixed position in advance, the servo amplifier 4 that receives the bit position can easily and quickly recognize whether or not the trace trigger has been received. In general, since the synchronous communication performed by the field network 9 between the controller 3 and the servo amplifier 4 has a performance capable of transmitting information at a sufficiently high speed, even if a slight time difference occurs in the transmission of the trace trigger between these nodes, it is possible to fall within a sufficiently allowable range from the viewpoint of data analysis.

<Details of Trace Data and Logging Data>

Figure 7:
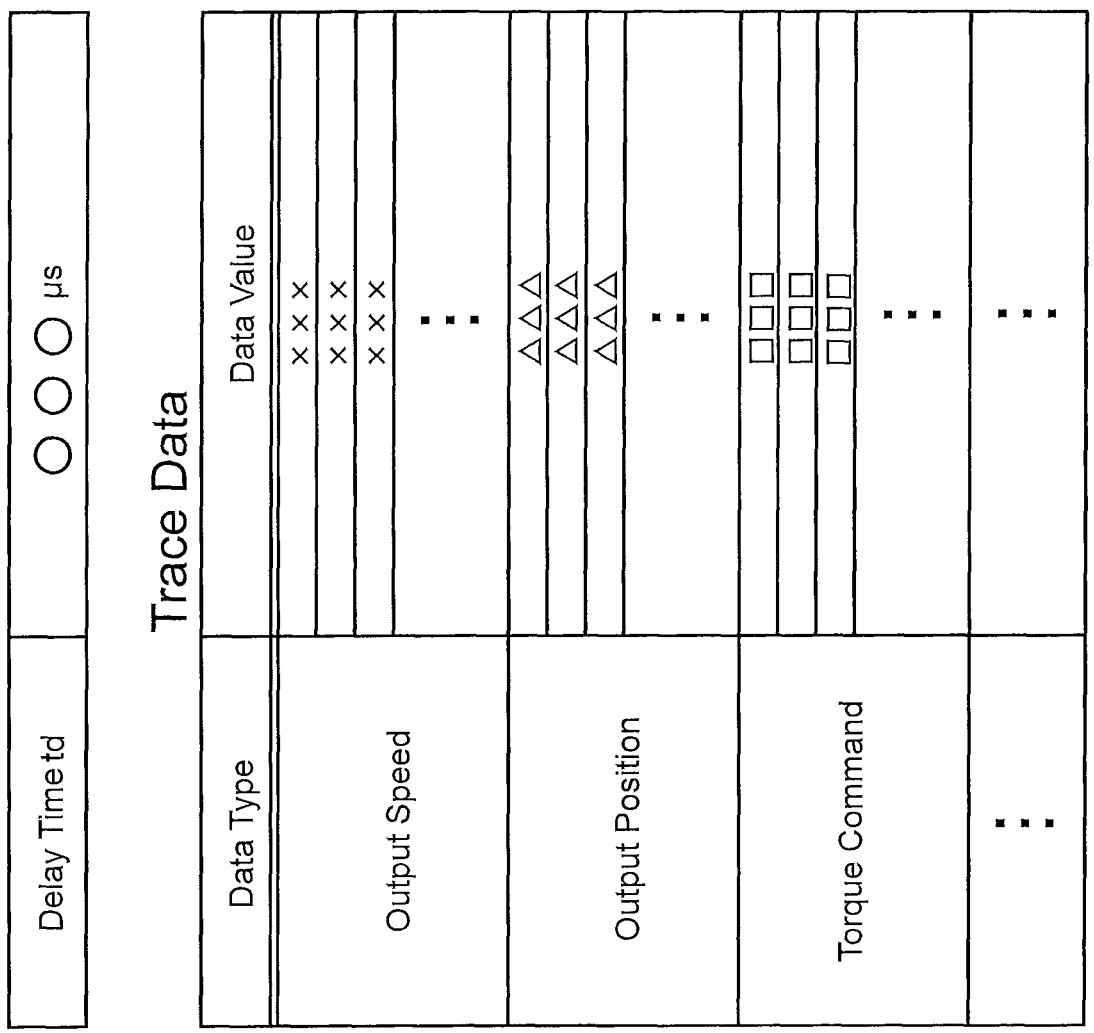
FIG. 7 is a diagram schematically showing the delay time and trace data transmitted from the servo amplifier to the controller via asynchronous communication.

FIG. 7 schematically shows the delay time td and the trace data transmitted from the servo amplifier 4 to the controller 3 via asynchronous communication. In the illustrated example, the delay time td is transmitted as a real time length (μs), but the delay time td may be transmitted as the counter value itself. In this case, the count cycle for counting up the counter value is also transmitted, and the counter value is converted into the real time length on the controller 3 side. In the trace data, various data such as an output speed, an output position, and a torque command can be acquired in the form of time series data of the same sampling period Δt and the same trace period starting from the data of the trace start time ts.

Figure 8:
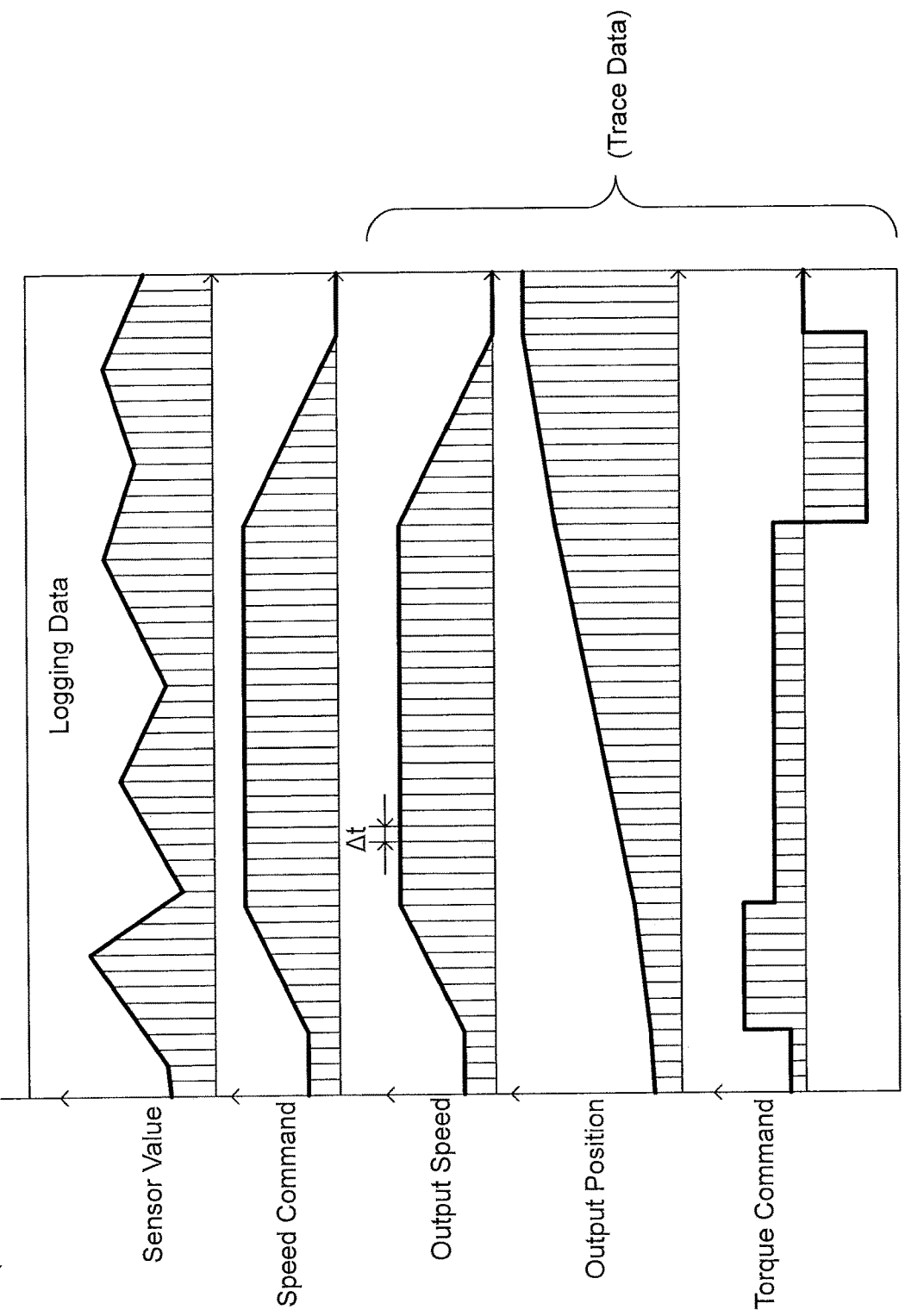
FIG. 8 is a diagram showing logging data created from data synchronized data.

The controller 3 that has received the delay time td and the trace data can synchronize the data with various control information and data generated and recorded by the controller 3 as shown in FIG. 8. That is, with respect to various control commands and data on the controller 3 side, only the same trace period is extracted from the trace start time ts obtained by adding the delay time td to the transmission time t1 of the trace trigger by the time correction of the step S12, and it is re-sampled at the same sampling period Δt. Thus, the data on the controller 3 side and the trace data on the servo amplifier 4 side can be normalized at the same timing, the same period, and the same sampling period, that is, the data can be synchronized.

As shown in FIG. 9, the logging data can be created by assigning the acquisition time (trace time) to each data unit. For example, the trace time of n-th (n=0, 1, 2,) data can be calculated by adding n×sampling period Δt to trace start time ts obtained by adding trace trigger transmission time t1 and delay time td acquired as calendar information in absolute time notation. Since the trace time of the absolute time notation is assigned to each data unit in the logging data, even when a large amount of data is acquired and stored, the trace time can be uniquely recognized in the data unit.

<Effects of the Embodiment>

As described above, according to the data collection system 100 of the present embodiment, the control procedure of the step S4 by the controller 3 transmits the trace trigger to the servo amplifier 4 through the synchronous communication, and the control procedure of the step S8 by the servo amplifier 4 traces the data related to the motor 5 (drive machine 1). At the same time, the count-up processing of the counter value from the step S6 by the servo amplifier 4 measures the delay time td from the reception of the trace trigger to the start of the trace, and the control procedures of the step S9 and the step S10 transmit the trace data and the delay time td to the controller 3 via asynchronous communication.

Thus, the controller 3 that has received the delay time td together with the trace data via the asynchronous communication can synchronize the data in consideration of the delay time td with the transmission time t1 of the trace trigger transmitted by the controller 3 itself as a reference. That is, the controller 3 can recognize the trace data traced at any timing in its own control sequence, and can organize and summarize the data so as to facilitate data analysis. As a result, more useful data can be collected.

In particular, in the present embodiment, the controller 3 stores the transmission time t1 when the trace trigger is transmitted in the step S5, and generates the logging data to which the trace time (t1+td+n×Δt: calendar information) is added in the step S12 and the step S13 based on the delay time td and the transmission time t1 received from the servo amplifier 4. This allows the controller 3 to process the received trace data as logging data organized by absolute time (so-called global time), thereby further improving the applicability to data analysis. In the above description, the trace time given to the logging data is based on the transmission time t1 based on the absolute time generated by the calendar IC12 of the controller 3, but it is not limited to the above. Alternatively, the controller 3 itself may independently start counting the counter value at a predetermined cycle from a predetermined reference time of the calendar IC12, and measure the transmission time t1 and the trace time with an actual time generated based on the counter value. In this case, it is possible to measure time up to the order of μ s which cannot be measured by a commercially available calendar IC12.

Further, particularly in this embodiment, the controller 3 transmits the trace setting information to the servo amplifier 4 in the step S2 after the transmission of the trace trigger. Thus, it is possible to flexibly set trace processing such as what kind of data should be traced by what sampling period Δt and trace start condition of the servo amplifier 4. In the present embodiment, data can be synchronized even when the trace start delay time td varies due to the influence of such trace setting. The transmission of the trace setting information by the controller 3 may be performed simultaneously with the trace trigger.

In particular, in this embodiment, the trace setting information includes the sampling period Δt for tracing the time series, and the trace time is given based on the delay time td, the transmission time t1, and the sampling period Δt when the logging data is created in the step S12 and the step S13. Thus, it is possible to arbitrarily set the time interval at which the servo amplifier 4 traces the time series data, and it is possible to generate the logging data to which the time is assigned with high accuracy corresponding to the time interval.

In the count-up processing of the counter value from the step S6 in the servo amplifier 4, that is, for the time measurement processing of the delay time td, it is desirable to measure the delay time td at a time cycle equal to or less than the minimum set value of the sampling period Δt. Thus, the trace start timing is of the time series data can be defined with accuracy equal to or higher than the sampling period Δt, and the synchronization time accuracy of the logging data can be secured.

In the present embodiment, in particular, in the control procedures of the step S12 and step S13, various control commands and data traced by the controller 3 itself are also added with a trace time based on the transmission time t1 and included in the logging data. Accordingly, various control commands and data traced by the controller 3 itself from, for example, an I/O port without passing through the servo amplifier 4 can be synchronized with the transmission time t1 of the trace trigger as a reference and included in the logging data.

Further, particularly in the present embodiment, since the trace trigger is bit information transmitted and received at a specific timing during synchronous communication, the servo amplifier 4 can easily and quickly recognize whether or not the trace trigger has been received at a predetermined accurate reception timing, and the timing accuracy of the delay time td can be improved accordingly.

The servo amplifier 4 may have, for example, a cycle control function of executing predetermined control processing at predetermined cycles so as to perform communication with an external device in addition to motion control. Even in the case where the servo amplifier 4 has the cycle control function as described above, the data synchronization function of the present embodiment depending on the communication cycle of the synchronous communication is particularly preferable in that high accuracy of data synchronization can be maintained without being affected by the cycle control function.

In particular, in the present embodiment, the servo amplifier 4 is a motor controller that drives and controls the motor 5, and the controller 3 is a control device that transmits a control command to the motor controller. The data synchronization function of the present embodiment is particularly suitable when the servo amplifier 4 is a motor controller and the controller 3 is a superordinate controller thereof.

In particular, in the present embodiment, the server 2 capable of transmitting a control command to the controller 3 and receiving logging data from the controller 3 is provided. This improves convenience in that the user directly starts logging at an arbitrary timing via the server 2 or the server 2 shares data analysis of logging data.

In this embodiment, in particular, the control procedures of the step S9 and the step S10 by the servo amplifier 4 transmit the trace data and the delay time td to the controller 3 via asynchronous communication. Thus, even data having a large data capacity such as time series data can be collectively and reliably transmitted to the controller 3. Further, when the data capacity of the trace data is sufficiently small (for example, when the data is traced only once), the servo amplifier 4 may transmit the trace data and the delay time td to the controller 3 via synchronous communication.

<Modification>

Note that the disclosed embodiments are not limited to the above, and various modifications can be made without departing from the spirit and technical idea thereof. Hereinafter, such a modified example will be described.

<When the Server Creates the Logging Data>

Figure 10:
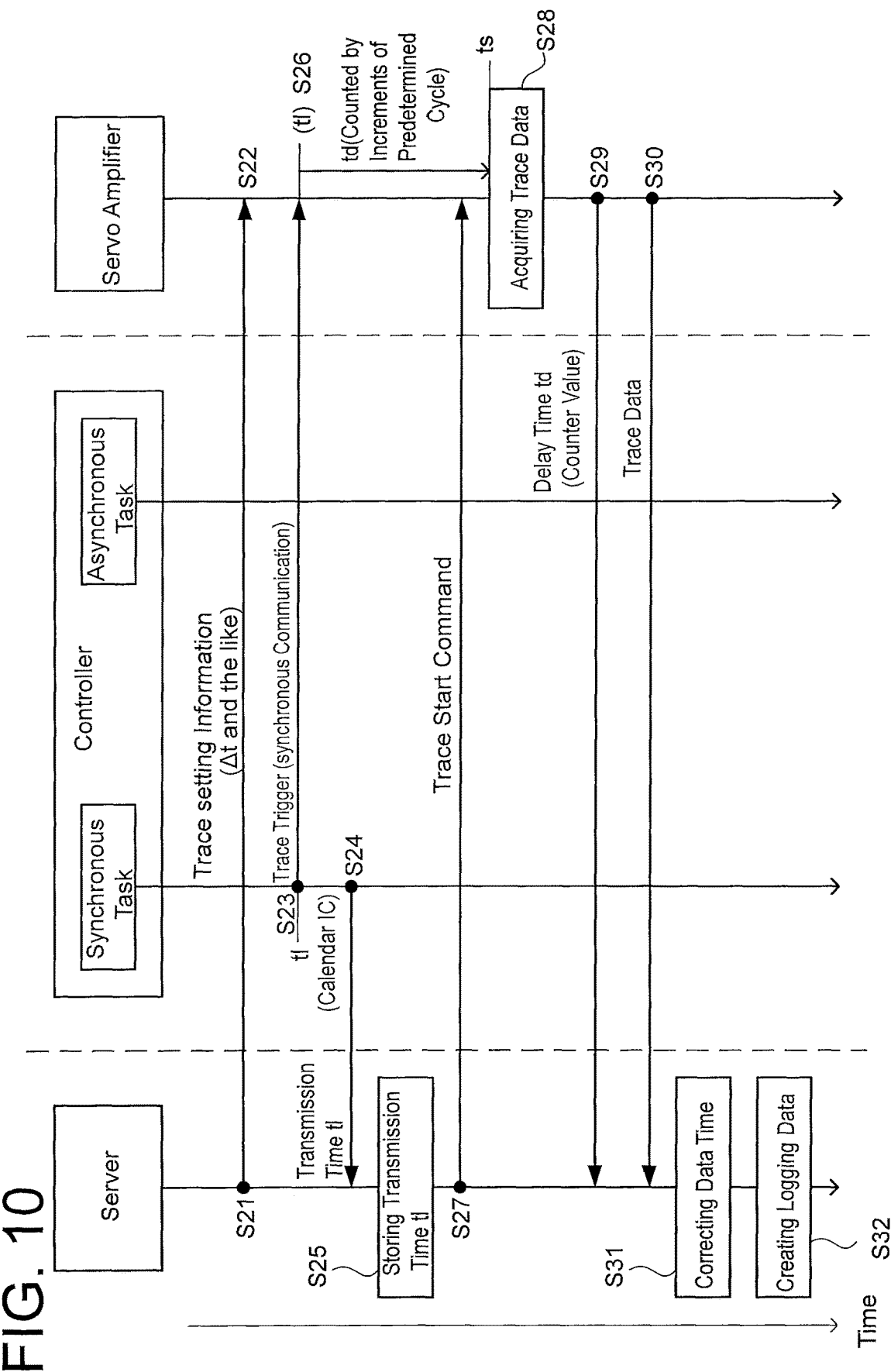
FIG. 10 is a sequence chart showing a process of collecting trace data and a process of generating logging data in a case where the server creates logging data.

In the above embodiment, the data collection and the creation of the logging data are performed mainly by the controller 3, but the present invention is not limited thereto. For example, as shown in FIG. 10 corresponding to FIG. 4, the server 2 may mainly collect data and create logging data.

Concretely, instead of the step S2 by the controller 3, the server 2 may transmit the trace setting information in the step S21, and the servo amplifier 4 receiving the trace setting information starts the pre-preparation processing so as to satisfy the trace start condition in the step S22. The trace trigger is transmitted to the servo amplifier 4 by synchronous communication in the step S23 by the synchronous task of the controller 3, and the transmission time t1 is transmitted to the server 2 in the step S24. Then, the servo amplifier 4 that has received the trace trigger starts count-up processing of the counter value in step S26, and transmits a trace start command to the servo amplifier 4 in step S27 by the server 2.

Thereafter, when the servo amplifier 4 satisfies all the trace start conditions, the trace processing is performed in step S28, and the count-up processing of the counter value is ended. Then, the delay time td and the trace data are transmitted to the server 2 at the step S29 and the step S30 of the servo amplifier 4. The server 2 receiving the delay time td and the trace data corrects the data time and creates the logging data in the step S31 and the step S32.

In this way, the server 2 performs the data collection and the creation of the logging data, so that the processing load of the controller 3 is reduced, and the generation of the motion control command with a margin and the synchronous communication can be performed. Although the transmission of the trace trigger via the synchronous communication may be performed by either the server 2 or the controller 3, it is desirable that the storage of the transmission time t1 is performed by the node itself that has transmitted the trace trigger. In this manner, by performing both the transmission of the trace trigger and the storage of the transmission time t1 thereof in any node of the controller 3 or the server 2, it is possible to secure the accuracy of the transmission time t1 when the trace trigger is transmitted to the servo amplifier 4, and it is possible to secure the accuracy of the data synchronization function. In addition to the configuration in which the server 2 and the controller 3 are separately formed as described above, the server 2 and the controller 3 can be integrally formed as a device.

<A case where Data is Collected from an External Device Connected to being Extended from an Encoder>

In the above embodiment, only the servo amplifier 4 and the controller 3 collect data, but the present invention is not limited thereto. For example, as shown in FIG. 11 corresponding to FIG. 1, the same data synchronization method can be applied to a case where data is collected from a sensor 13 extended from and connected to an encoder 10.

Figure 11:
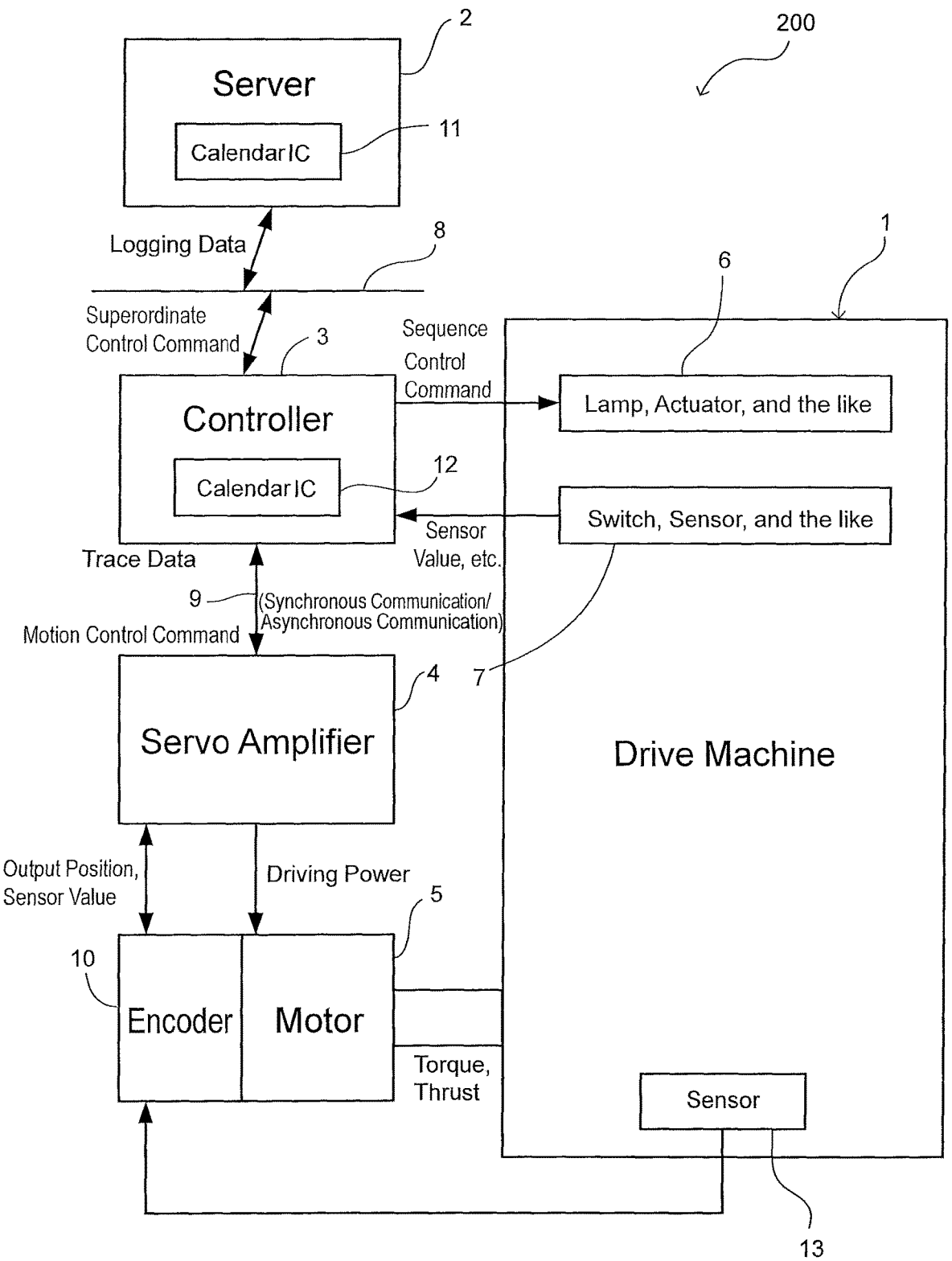
FIG. 11 is a diagram showing a schematic block configuration of a data collection system in a case where a server performs data collection independently.

In the example shown in FIG. 11, the encoder 10 connected to the servo amplifier 4 is further connected to a sensor 13 provided in the drive machine 1, and data detected by the sensor 13 can be transmitted to the servo amplifier 4 via the encoder 10. In this case, the servo amplifier 4 receives the data traced by the sensor 13 via the encoder 10, and the delay time from the reception of the trace trigger to the start of the trace by the sensor 13 is also separately measured.

The servo amplifier 4 separately transmits the trace data of the sensor 13 and the delay time corresponding thereto, in addition to the trace data and the delay time of the servo amplifier 4, to the controller 3. In this case, the controller 3 may synchronize the respective trace data in consideration of the respective delay times and combine them into one logging data. As a result, the servo amplifier 4 can also acquire data that cannot be directly traced by the servo amplifier 4 itself, and can similarly synchronize with this data.

In the above description, when there are descriptions such as "vertical", "parallel", and "plane", these descriptions do not have a strict meaning. That is, the terms "vertical", "parallel", and "plane" mean "substantially vertical", "substantially parallel", and "substantially plane", respectively, because design and manufacturing tolerances and errors are allowed.

In addition, in the above description, when there are descriptions such as "same", "identical", "equal", and "different" in terms of dimensions, sizes, shapes, positions, and the like in appearance, the descriptions do not have a strict meaning. That is, the terms "same", "equal", and "different" mean "substantially the same", "substantially the identical", "substantially equal", and "substantially different", respectively, with design and manufacturing tolerances and errors allowed.

In addition to those already described above, the techniques according to the embodiments and the modifications may be appropriately combined and used. In addition, although not illustrated, be made to the above—described embodiment and modifications without departing from the spirit of the invention.

What is claimed is:

1. A data collection system comprising:
a subordinate controller configured to control an electrical device;
a superordinate controller connected to the subordinate controller via synchronous communication and asynchronous communication to control the subordinate controller, the superordinate controller including a reference signal transmitter to transmit a timing reference signal to the subordinate controller via the synchronous communication; and
the subordinate controller comprising:
data storage configured to record data relating to the electrical device;
a delay time calculator to measure a delay time from a timing at which the subordinate controller receives the timing reference signal to a timing at which the data storage starts recording the data; and
a data transmitter configured to transmit the data and the delay time to the superordinate controller via the asynchronous communication or the synchronous communication.

2. The data collection system according to claim 1, wherein the electrical device is configured to drive industrial equipment.

3. The data collection system according to claim 1, wherein the data includes data units which are recorded at every sampling period.

4. The data collection system according to claim 3, wherein the superordinate controller comprises
transmission time storage configured to store a transmission time at which the reference signal transmitter transmits the timing reference signal; and
a logging data generator configured to generate logging data by relating each of recording time to each of the data units based on the delay time and the transmission time.

5. The data collection system according to claim 4, wherein the superordinate controller comprises a setting information transmitter to transmit data recording setting information in the data storage to the subordinate controller.

6. The data collection system according to claim 5, wherein the data recording setting information includes the sampling period, and wherein the logging data generator is configured to assign the recording time based on the delay time, the transmission time, and the sampling period.

7. The data collection system according to claim 6, wherein the delay time calculator is configured to measure the delay time at every time period equal to or less than the sampling period.

8. The data collection system according to claim 4, wherein the logging data generator is configured to relate recording time to data recorded by the superordinate controller.

9. The data collection system according to claim 4, wherein
the data storage is configured to receive data recorded in an external device connected to the electrical device,
the delay time calculator is configured to measure a delay time from a timing at which the timing reference signal is received to a timing at which the external device starts recording the data, and
the data transmitter is configured to transmit the data recorded in the external device and the delay time to the superordinate controller.

10. The data collection system according to claim 4, wherein the timing reference signal includes bit information to be transmitted and received at a specific timing during the synchronous communication.

11. The data collection system according to claim 4, wherein the subordinate controller has a cycle control function of executing predetermined control processing at every predetermined cycle.

12. The data collection system according to claim 11, wherein the electrical device comprises a motor.

13. The data collection system according to claim 12, wherein the subordinate controller comprises a motor controller which is configured to control the motor, and wherein the superordinate controller comprises a controller to transmit a control command to the motor controller.

14. The data collection system according to claim 13, wherein the superordinate controller includes a management controller configured to transmit the control command to the controller and to receive the logging data from the controller.

15. The data collection system according to claim 14, wherein at least one of the controller and the management controller includes the reference signal transmitter and the transmission time storage.

16. The data collection system according to claim 1, wherein the data transmitter is configured to transmit the data and the delay time to the superordinate controller via the asynchronous communication.

* * * * *